March 31, 1970  I. L. MARSHACK  3,503,838
LAMINATED FOAM PLASTIC ARTICLE AND METHOD FOR MAKING THE SAME
Filed April 22, 1965  3 Sheets-Sheet 1
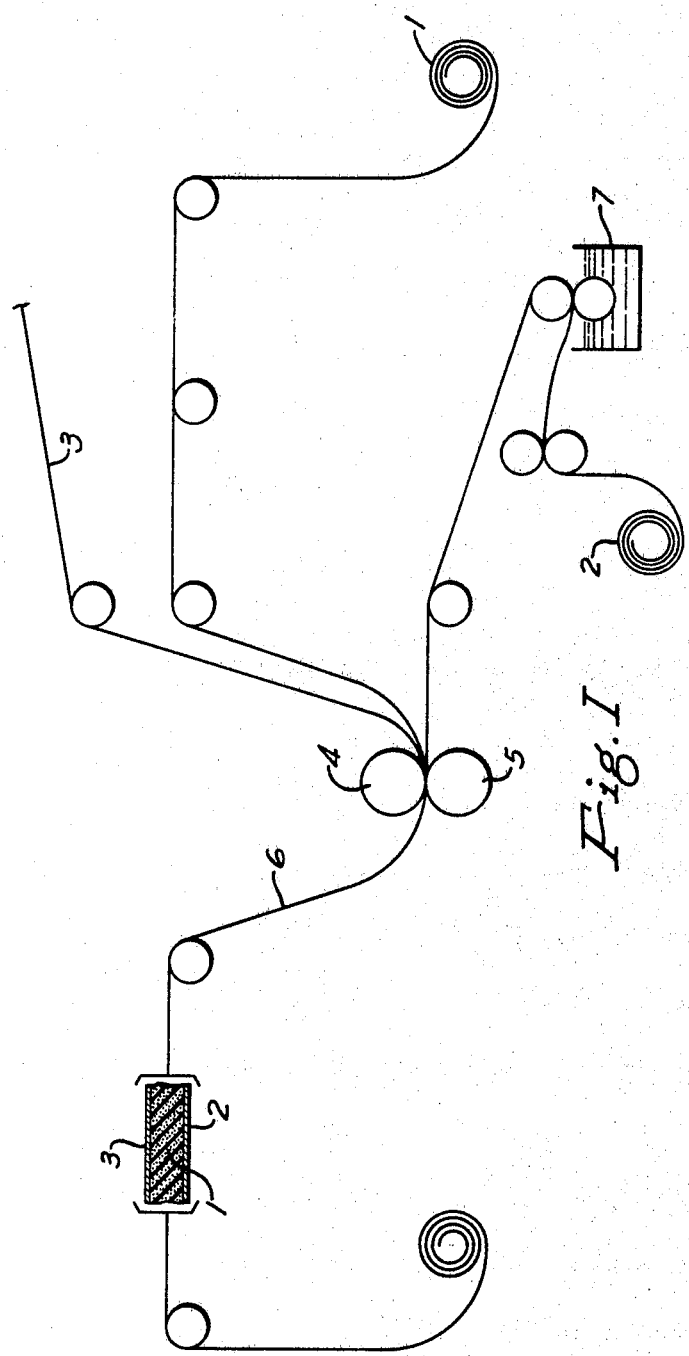
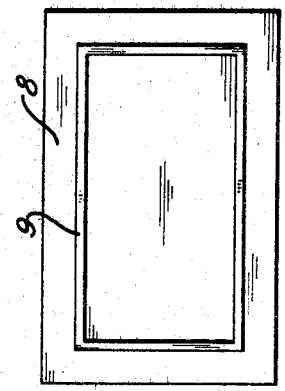
INVENTOR.
IRVING L. MARSHACK
BY
ATTORNEY.

March 31, 1970 I. L. MARSHACK 3,503,838
LAMINATED FOAM PLASTIC ARTICLE AND METHOD FOR MAKING THE SAME
Filed April 22, 1965 3 Sheets-Sheet 2
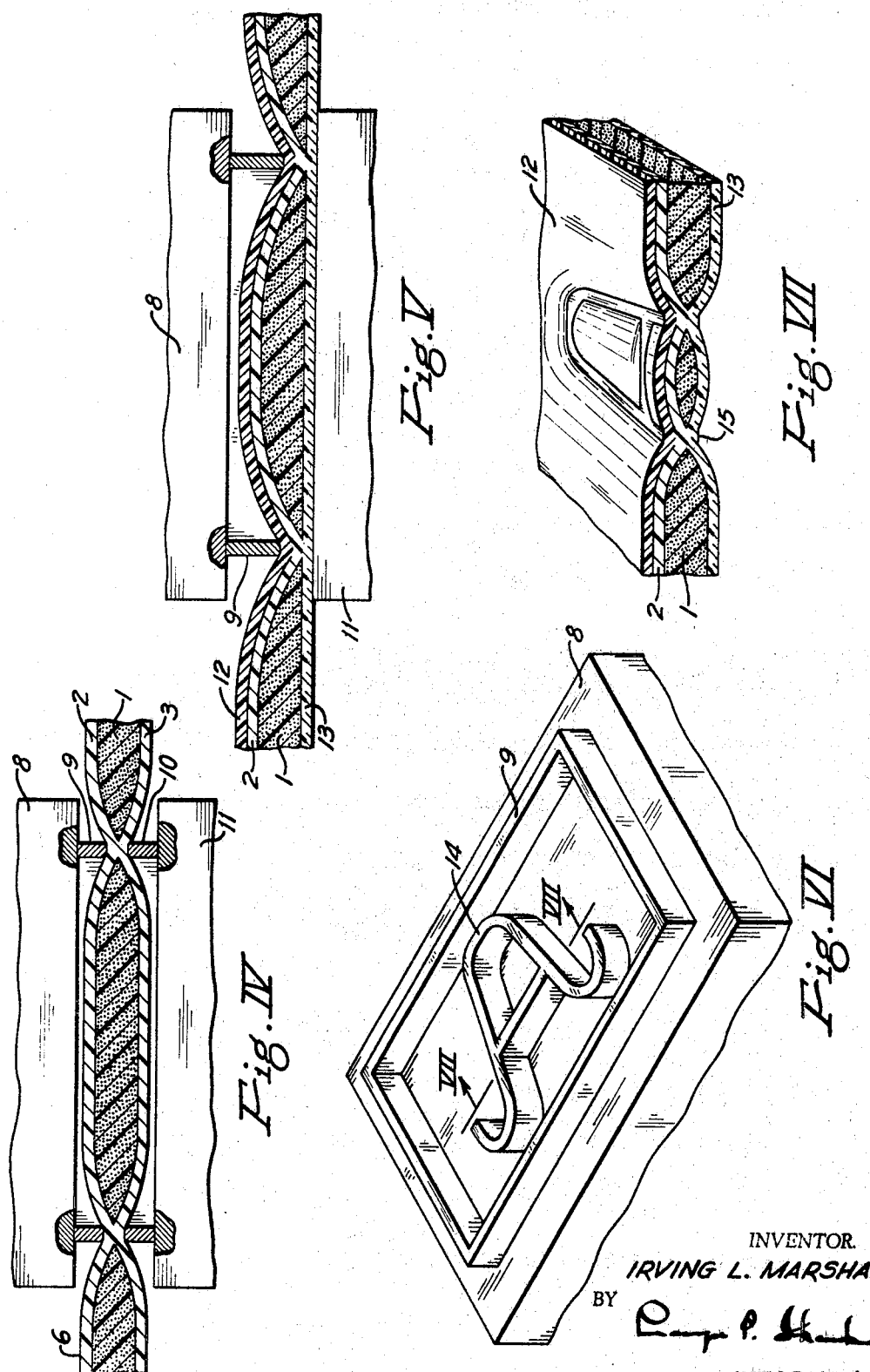
INVENTOR.
IRVING L. MARSHACK
BY
ATTORNEY.

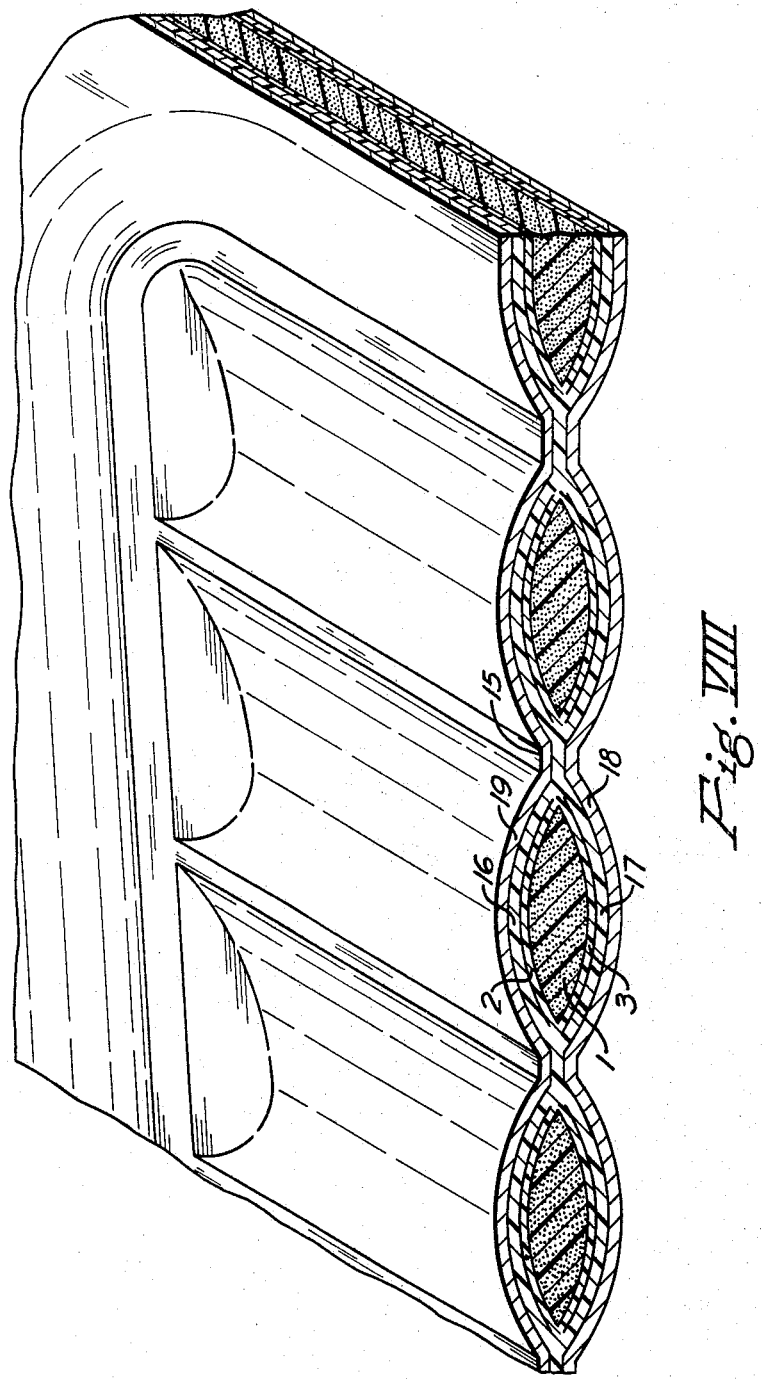
Fig. VIII
INVENTOR.
IRVING L. MARSHACK
ATTORNEY.

United States Patent Office 3,503,838
Patented Mar. 31, 1970

3,503,838
LAMINATED FOAM PLASTIC ARTICLE AND
METHOD FOR MAKING THE SAME
Irving L. Marshack, La Jolla, Calif., assignor, by mesne assignments, to Mobay Chemical Company, Pittsburgh, Pa., a corporation of Delaware
Continuation-in-part of application Ser. No. 369,491, Sept. 15, 1964. This application Apr. 22, 1965, Ser. No. 449,973
Int. Cl. B32b 31/06
U.S. Cl. 161—120     15 Claims

ABSTRACT OF THE DISCLOSURE

New articles of manufacture such as, for example, an article of upholstery, are prepared by a method wherein a plastisol containing a compatible resin is interposed between coextensive surfaces of a polyurethane foam and a self-sustaining thermoplastic film, pressing and heating the assembly to fuse the resin and heat-laminating the surfaces together while avoiding substance distortion of the self-sustaining film, covering at least the coated surface of the product with a self-sustaining thermoplastic film and pressing the assembly with an electronically energized die until the thermoplastic films are fused together along the die surface.

---

This invention relates generally to laminated foam plastic articles, and to a method for making the same, and, more particularly, to an improved method for forming polyurethane foam articles having a thermoplastic film covering. This application is a continuation-in-part of my application Ser. No. 369,491 filed Sept. 15, 1964, now abandoned.

It has been proposed heretofore to prepare laminates having a polyurethane foam core and resinous covering layers. One such method is disclosed in U.S. Patent 2,642,-920. In accordance with that method, a polyurethane foam is prepared by reaction of liquid components between two self-sustaining resinous films. Such a process requires the in situ formation of the foam and is not suitable for making, on a continuous basis, large quantities of laminated products. A method for coating a polyurethane foam with a resinous layer is disclosed in U.S. Patent 3,093,525. In accordance with that process, a preformed layer of polyester-polyurethane foam is coated with a liquid polyvinyl chloride and the liquid coating is cured on the surface of the foam.

A process for heat-sealing polyurethane foam to a thermoplastic film such as polyvinyl chloride is disclosed in U.S. Patents 2,979,836 and 3,026,233. In accordance with that method, one self-sustaining thermoplastic film is placed directly against a relatively thin layer of polyurethane foam and the resulting assembly is pressed with a preheated electronic die while passing a high frequency current therethrough. The resulting product is compressed and heated by the die to the point where a tear line is formed and the thermoplastic film only immediately adjacent the die is heat-sealed to the polyurethane foam.

It is an object of this invention to provide an improved method of enclosing a polyurethane foam layer between layers of thermoplastic film and to provide an improved laminated product. Another object of the invention is to provide a method for making polyurethane foam articles of a predetermined configuration having covering layers of thermoplastic film. Still another object of the invention is to provide a method for embossing, shaping, or encapsulating polyurethane foam having thermoplastic films on the surface thereof. A still further object of the invention is to provide a method for heat-sealing thermoplastic films about a polyurethane foam core. Still another object of the invention is to simultaneously laminate a thermoplastic film with a polyurethane foam and emboss the surface of the resulting laminate.

Other objects will become apparent from the following description with reference to the accompanying drawings in which:

FIGURE I is a diagrammatic view of an apparatus suitable for heat-sealing a thermoplastic film to a polyurethane foam in accordance with one embodiment of this invention;

FIGURE II is a diagrammatic view of an apparatus suitable for performing the second step of the process provided by this invention;

FIGURE III is a plan view of the platen of the press of FIGURE II showing the configuration of a die element;

FIGURE IV is a fragmentary vertical section, partly in elevation, illustrating an embodiment of the process provided by this invention;

FIGURE V is a fragmentary vertical section, partly in elevation, illustrating another embodiment of this invention;

FIGURE VI is a fragmentary perspective view illustrating a die suitable for embossing in accordance with this invention;

FIGURE VII is a fragmentary perspective taken along VII—VII of FIGURE VI, partially in section of a product formed with the die of FIGURE VI; and FIGURE VIII illustrates in a fragmentary perspective, partially in section, an embodiment of another type of product prepared in accordance with this invention.

The foregoing objects and others are accomplished in accordance with this invention, generally speaking, by providing a method wherein thermoplastic films separated by a polyurethane foam core are pressed and heated with an electronically energized die until the foam adjacent the die surface is substantially displaced and the thermoplastic films are heat-sealed together. In practicing a preferred embodiment of the invention, a polyurethane foam is first provided with an adherent thermoplastic film covering on at least one side thereof by interposing between coextensive surfaces of a polyurethane foam and a self-sustaining thermoplastic film a plastisol having dispersed therein a compatible thermoplastic resin and pressing and heating the resulting sandwich until the compatible resin is fused without substantial distortion of the self-sustaining film to perform a curing action of the compatible resin and to seal the self-sustaining film to the surface of the foam. In those embodiments wherein opposite sides of the foam are thus provided with an adherent thermoplastic film covering, the sandwich can be pressed and heated with an electronically energized die until substantially all if not all of the foam under the die edge is displaced and the thermoplastic films which had been on opposite sides of the foam become fused together to form a seal line which defines a product of a predetermined configuration. In another embodiment wherein it is desired to make a product having an embossing which is not easily torn along the weld line, a foam product is first provided on at least one side with an adherent thermoplastic film covering by means of a plastisol as described above. The resulting product is then assembled with one or two coextensive nonadherent, self-sustaining thermoplastic films which are fabric reinforced and this assembly is pressed and heated with an electronically energized die until the thermoplastic films on opposite sides of the foam become heat-sealed together. If the foam core having the adherent layer of thermoplastic film is assembled with only one nonadherent coextensive film, the assembly is made so that the adherent and non-adherent films are on opposite sides of the foam. Only the foam core under the edge of the die is displaced and the remainder of the core immediately adjacent the die becomes sealed to the reinforced thermoplastic films. In most instances, substantially all of the foam lying immediately between the energized die surfaces is displaced but in some instances, traces of foam may remain, usually as a discontinuous layer. Preferably, the thermoplastic resin surface of at least one of the reinforced films, if more than one is used, faces the other thermoplastic film to which it is to be heat-sealed to insure a strong bond. The resulting line formed by the die is not easily pulled apart when a reinforced film is used. This latter embodiment is particularly advantageous for making upholstered articles as will be described in more detail hereinafter.

As indicated hereinbefore, at least one side of a polyurethane foam core should be heat-laminated to a self-sustaining thermoplastic film by the plastisol method described herein before the high-frequency heat-sealing step to insure proper displacement of the foam and the formation of a mechanically strong seal of thermoplastic film to thermoplastic film. It has been found that if a core of polyurethane foam and two thermoplastic films are assembled one on the other without laminating with the plastisol as described above and this assembly is pressed and heated with an electronically heated die, the resulting seal of thermoplastic film to thermoplastic film is easily pulled apart. However, if at least one side of the foam has been secured to a thermoplastic film by means of the plastisol as described hereinbefore, the seal produced by the electronically energized die resists pulling apart. It is believed, although not definitely established, that the improved strength of the seal obtained when the foam has been first laminated to a thin thermoplastic film with a plastisol is at least partially due to distribution of the load at the heat-seal by the thin thermoplastic film. This is particularly advantageous because the resulting product is more durable and wearable.

One of the preferred methods of adhering coextensive webs of polyurethane foam and thermoplastic films is to roller coat one side of a continuous thermoplastic film with the plastisol described herein and pass the coated thermoplastic film and polyurethane foam web with the plastisol interspersed therebetween through the nip of a heated roll and a second roll pressed thereagainst. The second roll is provided with means to adjust the pressure against the heated roll to compress the sandwich to not substantially more than about 25% of its original thickness. It may or may not be heated too. The thermplastic film is heat laminated to the foam core, which, after passing between the rolls, rebounds substantially to its original thickness. It is believed that the plastisol substantially fills the surface pores in the core and provides for a strong bond with substantially uniform adhesion of the surface of the core to the juxtaposed surface of the thermoplastic film. In some instances, it may be desirable to cover opposite sides of a polyurethane core simultaneously with self-sustaining thermoplastic films. This can be done in accordance with this invention, particularly when the heated roll is used, by providing two webs of thermoplastic film coated with the plastisol.

Laminates of any polyurethane foam and an adherent film of any suitable thermoplastic synthetic resin can be prepared in accordance with this invention so that all such laminates are broadly contemplated. For example, the thermoplastic film heat-sealed with the plastisol to the foam can be polyvinyl chloride, polyamide, polypropylene, polycarbonate, polyvinyl acetate, copolymers of polyvinyl chloride and polyvinyl acetate, polyurethane and the like. In all instances, the thermoplastic film is a self-sustaining film and can vary in thickness. Preferably, the thickness thereof is from about 2 to about 10 mils or, in other words, from about 0.002 to about 0.010 inch. The plastisol used to heat-laminate the self-sustaining film to the surface of a polyurethane foam can contain any suitable compatible synthetic resin which fuses at a thermal exposure prior to any substantial amount of distortion of the self-sustaining film occurring. For example, the plastisol or organosol can contain polyvinyl chloride, polyvinyl acetate, copolymers of polyvinyl chloride and polyvinyl acetate, polymethyl methacrylate, polymethyl acrylate, butadiene acrylonitrile copolymer, polyvinyl acetals, and the like dispersed therein. The plastisol also contains a suitable plasticizer or mixture of plasticizers, such as, for example, dibutylphthalate, dioctylphthalate, diisodecylphthalate, diisooctylphthalate, a chlorinated biphenyl or a petroleum distillate having a high distillation range.

One adhesive composition which has been found particularly advantageous has a viscosity of about 3000 cps. and is a plastisol having polyvinyl chloride which fuses at a temperature of about 250° to 300° F. dispersed in a plasticizer such as dioctylphthalate and a petroleum distillate having a distillation range from about 600° to about 700° F. The plastisol also contains an epoxidized oil and a metallic salt stabilizer such as barium laurate or a cadmium or zinc salt of a carboxylic acid. A mercaptide can also be used as a stabilizer. The viscosity during use will gradually increase and best results are obtained if it does not exceed about 8000 cps.

The polyurethane foam is preferably a flexible material which can be prepared by conventional methods, such as, for example, the method described in U.S. Patent Re. 24,514. The polyurethane foam can be a polyester-polyurethane foam, a polyether-polyurethane foam, or the like. Other suitable processes for making polyurethane foams which can be used in practicing this invention are found in the art, such as, for example, U.S. 3,054,757, 3,061,556, and 3,067,148. Suitable polyether-polyurethane foams can be prepared by the processes disclosed in the art, including U.S. Patents 2,948,691, 3,094,495 and 3,044,971. For best results the polyurethane foam should have a compression deflection of from 20 to 40 pounds per fifty square inches of area at 25% deflection and the density should preferably be from about 1 to about 8 pounds per cubic foot.

In one preferred embodiment of the invention, a flexible polyether-polyurethane foam is used in combination with a self-sustaining polyvinyl chloride film which is adhesively bound to the foam by means of a polyvinyl chloride plastisol dispersion.

It has been found that by first securing the thermoplastic film to the foam core by means of the plastisol and then electronically heat-forming the desired product, the core of the foam can be relatively thick. On the other hand, when the foam core and thermoplastic films are assembled without first heat-laminating at least one thermoplastic film to the foam in accordance with this invention, dielectric heating will not heat-seal unless the foam is very thin, usually of less than one-quarter inch. The core of the produces made in accordance with this invention can be three or more inches in thickness. It has been found that even with such thick cores, having covers bound thereto with the plastisol, the foam between the thermoplastic film is displaced and the two films are heat-sealed together by pressing and electronically heating.

Referring now to the drawing, one step of an embodiment of the invention is illustrated in FIGURE I. In practicing this step of the invention, a roll of flexible polyether-polyurethane foam 1 and rolls of polyvinyl chloride film—about 3 mils in thickness—2 and 3 are provided. Films 2 and 3 are roller coated with a plastisol dispersion of polyvinyl chloride, which will be described in more detail hereinafter. This coating is applied to film 2 from pan 7 containing the plastisol. A similar arrangement is used to coat thermoplastic film 3. The thermoplastic films 2 and 3 and the polyurethane foam web 1 are brought together with the plastisol coated sides of thermoplastic films 2 and 3 against and coextensive with opposing surfaces of foam 1 by rolls 4 and 5. Roll 4 is a heated pressure roll which can be adjusted to exert the proper pressure on the assembly against collander roll 5. Collander roll 5 is heated by any suitable means, such as, for example, by pumping heated oil, or other suitable liquid, therethrough. Thermoplastic films 2 and 3 become adhesively bound to core 1 when the temperature of the plastisol is raised above the fusion point of the polyvinyl chloride by the heated surface of roll 5. The resulting assembly 6 is then drawn over suitable rolls and eventually wound into a roll suitable for handling. It is advisable to permit cooling of assembly 6 to below the fusion temperature of the polyvinyl chloride before rolling it for storage. An enlarged fragmentary section 6 in FIGURE I shows the relationship of core 1 with respect to thermoplastic films 2 and 3. The temperature of roll 5 can vary in so long as the polyvinyl chloride dispersed in the plastisol is fused and the self-sustaining films 1 and 3 are not substantially distorted. The temperature of the roll will usually be between about 250° to about 300° F. If it is desired to cover only one side of foam 1 with a thermoplastic film, web 3 is not used and roll 4 need not be heated.

The adhesives used in the above embodiment of the first step of the process can be of the following formulation, with the parts given by weight:

100 parts polyvinyl chloride, fusion point 250° to 300° F.
50 parts dioctylphthalate
20 parts of petroleum distillate having a distallation of 600° to 675° F.
5 parts epoxidized
3 parts barium laurate The product obtained from the apparatus illustrated in FIGURE I is then heated-sealed with the apparatus of FIGURE II. This apparatus is a conventional electronically energized press having head 8 on which electronic die 9 is suitably fastened. The base of press 11 supports a corrseponding die 10. A view of the face of press head 8 illustrating the positioning of die 9 is shown in FIGURE III. FIGURE IV illustrates the press in operation. Laminate 6, composed of thermoplastic films 2 and 3 adhesively bound to foam core 1, is compressed and electronically heated as illustrated. As shown in FIGURE IV, the foam core is displaced from the area between dies 9 and 10, and the two thermoplastic films 2 and 3 come into contact with each other and are heat-sealed together. In most instances, films 2 and 3 are fused into one under the edge of die 9. If both films 2 and 3 are self-supporting thermoplastic films such as polyvinyl chloride without any reimbursement, the line formed by the heat-sealing of films 2 and 3 together is a tear line or a bar seal depending upon the configuration of the die. This embodiment can be used to make cushions or the like in which the adherent films 2 and 3 serve as the surface of the product and the configuration of the cushion conforms to that of the dies with the excess material being removed by tearing along the heat seal produced by the dies.

The product prepared with the apparatus illustrated in FIGURE I with one or more coverings of a nonreinforced self-sustaining thermoplastic film can also be used to advantage as a core in forming various articles such as upholstery. In making such articles it is usually desirable to cover the core having a heat-sealed thermoplastic film with two nonadherent thermoplastic films at least one of which has been reinforced by a scrim or other fabric backing. An apparatus suitable for making such an article is illustrated in FIGURES V and VI. Electronically heated die 9, of a general rectangular configuration, is mounted on platen 8. Die 9 is relatively thin in cross section and, when pressed against the surface of the base of the press, will define a rectangularly shaped article. In order to produce an embossed surface, an additional electronically heated die 14 is provided within the area defined by die 9. Die 14 can be of any fanciful design, such as, for example, a letter of the alphabet or any other configuration desired in the finished article. As shown in FIGURE VI, it is the letter A. An article produced in this die would have a rectangular weld line corresponding to the outline of die 9 and a weld line corresponding to the contour of die 14. The assembly shown in FIGURE V has foam core 1, polyvinyl chloride film 13 which is reinforced by having a scrim backing facing the base 11 of the press, plastisol sealed polyvinyl chloride film 2 adhering to the surface of core 1 and polyvinyl chloride film 12.

FIGURE VII illustrates the weld 15 formed by die 14 in cross section, showing films 12, 2, and 13 fused into one. The product of FIGURE VII is shown as it would appear if cut along a line corresponding to the VII—VII of FIGURE VI. The view is a fragmentary view and does not show the weld lines produced by the rectangular die. It is to be noted that in this embodiment core 1 had only one heat-sealed thermoplastic film covering 2. A core having such a covering 2 on both sides could be used. In separating the desired product from surrounding scrap, shears can be used to cut along the weld line formed by die 9.

In order to demonstrate the comparative strength of heat-seal seams prepared in accordance with this invention and those produced by merely electronically heating an assembly of thermoplastic film and polyurethane foam, the following series of samples were prepared and tested:

(A) A polypropylene-ether polyurethane-foam web about ⅜ inch thick was assembled between two layers of polyvinyl chloride film 0.002 inch thick, and a heat-sealed line was formed by pressing and heating the assembly with an electronically energized die similar to that of FIGURE V.

(B) The same polyurethane foam as used in A was coated with one polyvinyl chloride film about 0.002 inch thick by means of a polyvinyl chloride plastisol as described with reference to FIGURE I hereinbefore, and the resulting product was assembled with two polyvinyl chloride films like those used in A and heat-sealed under the same conditions as in A.

Sections of Samples A and B, one inch wide with a transverse weld, were then pulled until the seal failed and the polyvinyl chloride film tore or became separated from the core. About 3.3 pounds per inch tore Sample A along the weld line, whereas 15.3 pounds per inch were required to pull apart Sample B along the weld line.

The embodiment shown in FIGURE VIII is formed with a press similar to that of FIGURES V and VI except the configuration of the die is such that a quilted design is imparted to the assembly during heat sealing. In this particular embodiment, 19 is a fabric or cloth such as jersey cloth and 16 is a polyvinyl chloride film. The jersey is on the surface with the vinyl lying against film 2. The covering on the other side of core 1 is a laminate of polyvinyl chloride film 17 and scrim or similar fabric backing 18. Film 17 lies against adherent polyvinyl chloride film 3. This embodiment is particularly advantageous for making upholstered articles where a fabric surface is desired. The scrim strengthens the heat seal. The scrap outside the edges of any weld line 15 can be removed by cutting with scissors.

The invention is also applicable to the preparation of articles having polyurethane foam core and paper coating. For example, paper could be substituted for fabric 19 in the embodiment of FIGURE VIII. The paper can have an adherent film of thermoplastic resin such as polyvinyl chloride or sheets of paper and sheets of self-sustaining thermoplastic film can be loosely assembled together and used instead of laminae 17 and 16.

It is to be understood that the invention is not limited to the particular polyurethane foam or thermoplastic film described with respect to the drawing and that any other suitable thermoplastic film and polyurethane foam can be used. It is also to be understood that the invention is applicable to the formation of many types of articles, such as mattresses, pads, and the like, having various types of designs embossed on the surface thereof. The thermoplastic film can be reinforced with any suitable material, including the scrim mentioned above, or by any other fabric or with suitable fibers made from other resinous materials such as polyamides in so long as the strength of the fibers is such that the tear strength of the thermoplastic film is increased. Likewise, the plastisol can contain other plastics having a low fusion point, and the invention is not limited to the use of a polyvinyl chloride dispersion. In most instances, it would be preferable to use a plastisol containing a resin of similar chemical composition to that of the self-sustaining films. In electronically heat-sealing the thermoplastic films together, care should be taken not to destroy the films with excessive temperatures. The films should only be heated to the point where they become heat-sealed together.

The invention provides a novel means for making upholstery items which have been provided in the past with a design by a stitching operation. Often the cushion on the back of a chair is stitched to impart a design to its surface. This design can now be formed in accordance with this invention by using an electronically energized die of the type shown in FIGURE V provided the core of the upholstery item is a polyurethane foam having a self-sustaining thermoplastic film bound thereto by means of a plastisol. The covering of the core is preferably reinforced to impart the necessary strength to the embossed product. The reinforced thermoplastic films which have been used in the past for making such products and designed by stitching can be used in this invention.

Although the invention has been described in considerable detail in conjunction with preferred embodiments of the invention, it is to be understood that the invention is not limited to such detail and that those skilled in the art can make modifications therein without departing from the spirit and scope of the invention except as it is limited by the claims.

What is claimed is:

1. A method for making a laminate which comprises interposing a plastisol between coextensive surfaces of a polyurethane foam and a self-sustaining thermoplastic film, pressing and heating the assembly to fuse the resin and heat-laminate the said surfaces together, while avoiding substantial distortion of the self-sustaining film, covering at least the coated surface of the resulting product with a self-sustaining thermoplastic film and pressing the assembly with an electronically energized die until the said thermoplastic films are fused together along the die surface.

2. A method for making a laminated structure which comprises sandwiching a layer of polyurethane foam between self-sustaining thermoplastic films, each coated with a plastisol comprising a low-fusion-point resin, heating and pressing the resulting assembly until the covering layers are adhered to the foam and thereafter pressing the resulting assembly with an electronically energized die until the said covering layers meet and are heat-sealed to each other.

3. A method for making a laminated structure which comprises interposing a layer of polyurethane foam between layers of thermoplastic film coated with a plastisol containing a low-fusion-point synthetic resin, pressing and heating the resulting assembly to fuse the said resin while avoiding substantial distortion of said film until the coated surfaces of said layers of thermoplastic film coextensive with said foam are adhered to the foam, and thereafter pressing the resulting assembly with an electronically energized die until the foam under said die and between layers of said film is displaced and the layers of film are fused together adjacent the die surface.

4. A method comprising heat-laminating a thermoplastic film to at least one side of a polyurethane foam web by a process which comprises fusing a thermoplastic resin between coextensive surfaces of said foam and said film while avoiding substantial distortion of the film, sandwiching the resulting laminate between layers of a reinforced thermoplastic film compatible with the first said film, pressing and heating the resulting assembly with an electronically energized die until the foam adjacent the die surface is displaced and the layers of said reinforced films are fused into one.

5. The method which comprises interposing a polyurethane foam web heat-sealed to at least one layer of a thermoplastic non-adherent film between layers of self-sustaining thermoplastic film, pressing the resulting assembly with an electronically energized die defining a configuration corresponding to that of the said article until the foam adjacent the die surface is displaced and the layers of thermoplastic film become fused together adjacent the die surface forming a tear line defining the shape of the said article, and tearing along the said tear line to separate the said article from the remainder of said assembly.

6. A method for making an embossed article having a polyurethane foam core and a thermoplastic covering which comprises fusing a thermoplastic resin between a self-sustaining thermoplastic film and a polyurethane foam while avoiding substantial distortion of the said film until the thermoplastic film becomes heat-laminated to the surface of the polyurethane foam, placing the resulting product between two reinforced self-sustaining thermoplastic films, pressing the resulting assembly with a pre-designed electronically energized die until the films become heat-sealed together along predetermined lines to form a predetermined embossed design and shaped article.

7. A method for making an article having an embossed surface which comprises providing a polyurethane foam having a covering of a thermoplastic film heat-sealed thereto, interposing this product between two layers of a reinforced thermoplastic film, heating and pressing the resulting assembly with a die of predetermined configuration until the layers of reinforced thermoplastic film become heat-sealed together under the edge of the die, thereby imparting a predetermined design to the assembly.

8. A method for making an article of upholstery having a polyurethane core and a thermoplastic film covering which comprises heat-laminating a thermoplastic film to at least one surface of the foam by a method comprising fusing a compatible thermoplastic resin therebetween, placing a self-sustaining thermoplastic film over the resulting coated surface of the foam and pressing and heating the assembly with an electronically energized die until the two films are heat-sealed together.

9. A method for laminating a polyurethane foam and a self-sustaining thermoplastic film which comprises heat-laminating a thermoplastic film to one surface of a polyurethane foam by fusing a compatible resin in a plastisol between the foam and film, placing a self-sustaining thermoplastic film against the uncoated surface of the foam and pressing and heating the assembly with an electronically energized die until the films are sealed together through the foam.

10. As a new article of manufacture, a polyurethane foam, a thermoplastic film bound by a compatible resin from a plastisol to a coextensive surface of the foam, and a self-sustaining thermoplastic film coextensive with the surface of the foam opposite the one bound to the first said film, the said thermoplastic films being heat-sealed together at least at one point of their coextensive surfaces.

11. The product of claim 9 wherein the said thermoplastic films are polyvinyl chloride films.

12. As a new article of manufacture, an article of upholstery comprising a polyurethane foam core, a thermoplastic resinous film covering at least part of a surface of said core and bound thereto with a compatible resin from a plastisol, a second thermoplastic resinous film lying adjacent the first said film and heat sealed thereto at least in one place along its coextensive surface.

13. The article of claim 12 wherein the last said thermoplastic resinous film is laminated to a coextensive fabric.

14. The article of claim 13 wherein the fabric forms an outer surface of said upholstered article.

15. The article of claim 12 wherein the last said thermoplastic film is laminated to paper.

References Cited

UNITED STATES PATENTS

| | | |
|---|---|---|
| 2,878,153 | 3/1959 | Hacklander. |
| 2,962,406 | 11/1960 | Rosa _____ 161—160 X |
| 3,170,178 | 2/1965 | Scholl _____ 156—251 X |
| 3,244,571 | 4/1966 | Weisman _____ 156—196 |
| 3,256,131 | 6/1966 | Koch et al. _____ 161—119 |

FOREIGN PATENTS

| | | |
|---|---|---|
| 1,329,849 | 6/1963 | France. |
| 790,666 | 2/1958 | Great Britain. |
| 821,539 | 10/1959 | Great Britain. |

ROBERT F. BURNETT, Primary Examiner

W. A. POWELL, Assistant Examiner

U.S. Cl. X.R.

161—146, 161; 156—196, 272, 306, 313